United States Patent
Milholen et al.

(10) Patent No.: US 10,005,203 B1
(45) Date of Patent: Jun. 26, 2018

(54) BRICK VENEER CUTTING MACHINE

(71) Applicant: Basic Machinery Company, Siler City, NC (US)

(72) Inventors: Barry Milholen, Siler City, NC (US); Hal Milholen, Siler City, NC (US); Josh Johnson, Siler City, NC (US)

(73) Assignee: Basic Machinery Company, Inc., Siler City, NC (US)

( * ) Notice: Subject to any disclaimer, the term of this patent is extended or adjusted under 35 U.S.C. 154(b) by 276 days.

(21) Appl. No.: 15/174,380

(22) Filed: Jun. 6, 2016

(51) Int. Cl.
*B28D 7/04* (2006.01)
*B28D 7/02* (2006.01)
*B28D 1/04* (2006.01)

(52) U.S. Cl.
CPC .............. *B28D 7/04* (2013.01); *B28D 1/047* (2013.01); *B28D 1/048* (2013.01); *B28D 7/02* (2013.01)

(58) Field of Classification Search
CPC .......... B28D 1/048; B28D 1/047; B28D 7/02; B28D 7/04
USPC ....................................................... 125/13.01
See application file for complete search history.

(56) References Cited

U.S. PATENT DOCUMENTS

| | | | | |
|---|---|---|---|---|
| 2,187,299 A * | 1/1940 | Burkhardt | .............. | B28D 1/048 125/13.01 |
| 2,460,386 A * | 2/1949 | Hillquist | ................ | B28D 1/047 125/13.01 |
| 2,693,056 A * | 11/1954 | Gagne | .................. | B23D 45/105 125/13.03 |
| 3,672,099 A * | 6/1972 | Parkhurst | ............ | B24B 27/0023 125/13.01 |
| 3,738,349 A * | 6/1973 | Cooper | ................ | B23D 47/047 125/13.01 |
| 3,840,000 A * | 10/1974 | Bible | ........................ | B28D 1/04 125/13.01 |
| 4,660,539 A * | 4/1987 | Battaglia | ................. | B24B 7/005 125/10 |
| 7,011,085 B1 * | 3/2006 | Lochotzki | ................ | B28D 7/04 125/23.02 |
| 7,771,249 B2 * | 8/2010 | Schlough | ............... | B28D 1/046 125/13.01 |
| 8,100,740 B2 | 1/2012 | Schlough et al. | ................ | 451/5 |
| 9,138,914 B1 * | 9/2015 | Higgins | .................... | B28D 7/04 |
| 2009/0126711 A1 * | 5/2009 | Gomez | .................. | B28D 1/005 125/15 |
| 2010/0043771 A1 * | 2/2010 | Hiser | ...................... | B28D 7/043 125/35 |

* cited by examiner

*Primary Examiner* — Marc Carlson
(74) *Attorney, Agent, or Firm* — MacCord Mason PLLC

(57) ABSTRACT

Cutting bricks includes rotating a turntable having jigs. Bearings on clamp arms of the jigs are urged against a cam surface at first and second sides of the turntable to open the clamp arms to permit loading and unloading of unclamped brick. Bricks are loaded into the jigs on the turntable from both sides of the turntable by positioning the bricks in jigs with opened clamp arms. One clamp arm can clamp the brick against a side plate portion below a saw blade height and one can clamp above saw blade height. The turntable continues to rotate to release the arms from the cam surface to cause clamp arms to close. At least two brick saws positioned adjacent the turntable cut clamped bricks loaded into jigs on the turntable. Cut bricks are unloaded at the sides of the turntable when the clamp arms open.

39 Claims, 5 Drawing Sheets

BRICK VENEER CUTTING MACHINE

BACKGROUND OF THE INVENTION

The present invention relates to brick cutting machines, particularly brick cutting machines for cutting a veneer from a fired brick. Brick veneers have become popular and are used in various construction modes to provide a brick-like look without using a full brick. However, to obtain a brick veneer, a full brick must be made and fired in order to have the firing of the brick be adequate. Thus, there is a need for a brick cutting machine that will cut the veneer from the brick so that it can be used in a veneer process.

Brick cutting machines are known, however, they have a number of drawbacks. Most particularly, they are slow, so that the throughput of the machine is reduced. Also, brick cutting machines can introduce flaws or imperfections in the veneer. The imperfections can take two forms. One is a chip out of the veneer that should not be there, leaving a void. Another form of imperfection is an incomplete removal, so there is a protrusion from the veneer where it is not desired. Conventional brick cutting machines have had relatively poor performance in both throughput and yield, with throughput rates of perhaps 400 to 800 pieces per hour, but yielding only 60% acceptable product.

It is known to use a turntable with jigs to position bricks for cutting, but only to move past a single rotary blade, and the jigs of that prior technology did not hold the bricks as well, positioning the bricks with leaf springs that extended over sides of the brick and could be too tight or too loose. This machine continued to have throughput and quality problems.

Thus, there is a need in the art for an improved brick cutting machine to improve efficiency, as well as to improve the quality yield from the brick cutting operation.

SUMMARY OF THE INVENTION

The present invention fulfills one or more of these needs in the art by providing an apparatus for cutting bricks that includes a frame with a turntable rotatably mounted to the frame. At least two circular brick saws having blades are mounted at spaced positions around the turntable, and at least two brick loading/unloading stations are spaced from each brick saw. A plurality of brick gripping jigs are mounted on the turntable, so that a brick may be loaded in one of the brick gripping jigs at one of the loading/unloading stations, rotate on the turntable past one of circular brick saws for brick cutting to another brick loading/unloading station to be unloaded from the brick gripping jig. Typically the apparatus includes motors to drive the brick saws and turntable.

Preferably, hoods on the frame bound the brick saws to contain debris generated by sawing. The hoods may be pivotally mounted to the frame above the bricks saws. A retractable shielding preferably bounds at least one of the loading/unloading stations. Water nozzles may be mounted to the frame to send water at the brick saws to entrain debris generated by sawing and sloped surfaces below each of the brick saws connected to a drain allow water and entrained debris to flush to the drain.

The brick gripping jigs preferably include a jig base having a side plate, and a plurality of clamp arms supported above the jig base spaced from the side plate, so that each clamp arm clamps different parts of a brick against the side plate independently of other clamp arms. Preferably, at least one clamp arm is positioned on the jig so it will pass under each brick saw blade, and at least one clamp arm is positioned on the jig so it will pass above each brick saw blade. The clamping arms preferably each have a gripper block and a bearing spaced from one another and a pivot mount at a point between the gripper block and the bearing. A spring typically urges the clamping arm to pivot toward the side plate.

The frame preferably has a camming surface positioned to act on the bearing of each of the clamping arms at the loading/unloading stations to act in opposition to the spring and cause the clamping arm to pivot away from the gripper block.

Preferably, the plurality of clamping arms each clamp a brick against the side plate with a force of at least 150 pounds.

A back plate is typically mounted to the jig base perpendicular to the side plate. The position of the back plate can preferably be adjusted on the jig, thereby also adjusting the radial position of the back plate on the turntable. The back plate may be mounted to the jig base by bolts that can be turned to adjust the radial position of the back plate on the turntable.

The side plate preferably has a portion or component positioned on the jig so it will pass under each brick saw blade, and a portion or component positioned on the jig so it will pass above each brick saw blade.

The jigs are preferably mounted on the turntable at positions that are not directly opposite one another, so that the turntable presents bricks to the brick saws alternately, so both saws do not saw bricks simultaneously.

The invention can also be considered as the gripping jig itself apart from the turntable apparatus, suitable for other brick cutting configurations.

The invention can also be considered to be a method of cutting bricks that includes loading bricks into jigs on a turntable from a first side of the turntable and loading bricks into jigs on the turntable from a second side of the turntable, rotating the turntable while operating at least two brick saws positioned adjacent the turntable, cutting bricks that have been loaded into a jig with one of the saws as bricks pass from the first side to the second side, and cutting bricks that have been loaded into jig with the other of the two brick saws as bricks pass from the second side to the first side, and at each side, unloading cut bricks from the jigs.

Cutting bricks with the two brick saws preferably does not take place simultaneously on both saws.

Unloading cut bricks may include repositioning cut bricks to make a second cut. When making a second cut, cutting bricks may include cutting most of a long side of a brick and cutting most of an end of a brick with each cut intersecting, to result in a brick veneer corner.

Loading bricks into jigs may include positioning the bricks in jigs with opened clamp arms, followed by automatic clamp arm closure. Loading bricks into jigs may include loading the brick so that at least one clamp arm clamps the brick against a side plate portion below a saw blade height and at least one clamp arm clamps the brick against another side plate portion above saw blade height.

Rotating the turntable may include causing bearings on arms of the jigs to be urged against a cam surface at the first side and second side to open the clamp arms to permit loading and unloading of unclamped bricks.

The method may also include adjusting a radial position of a jig back plate to control the depth of cut into a brick clamped in the jig.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
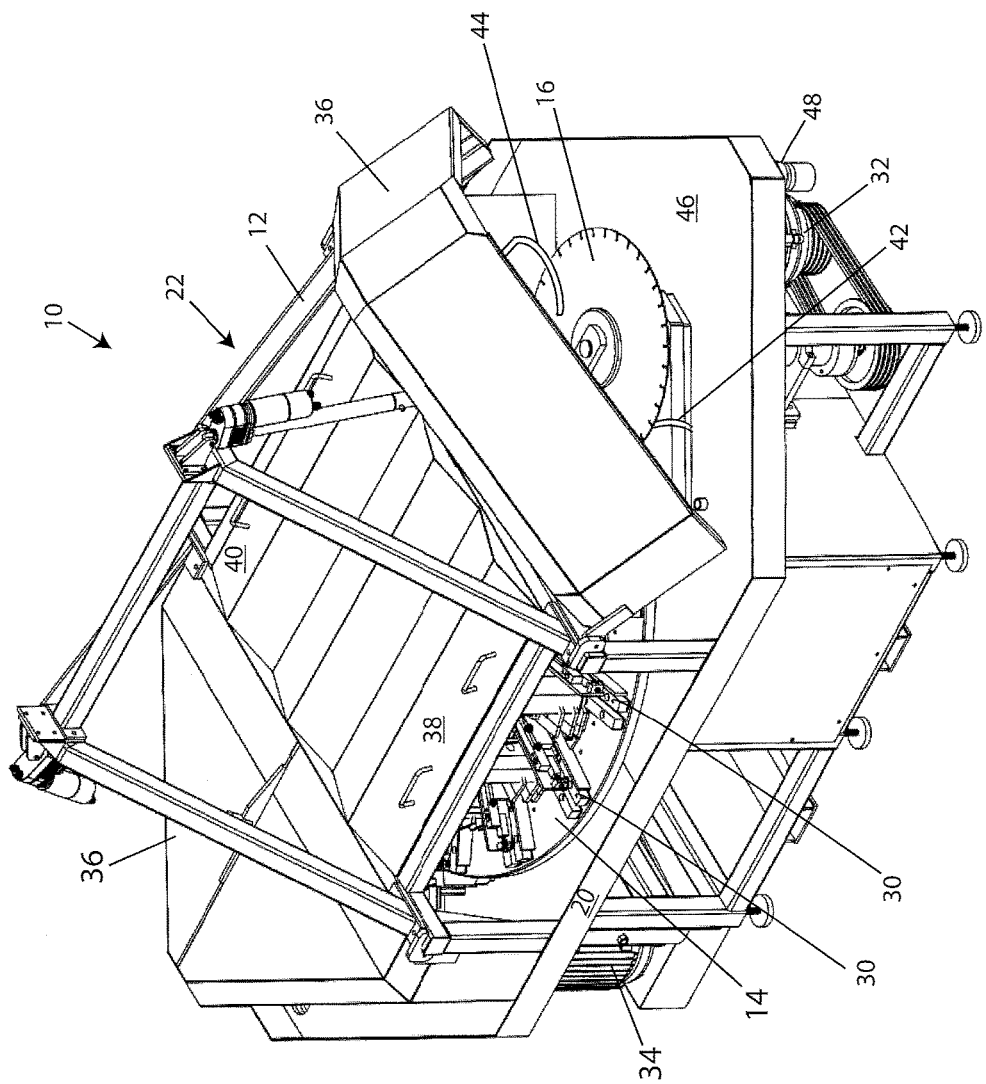
FIG. 1 is a top perspective view of an embodiment of a brick veneer cutting machine according to an embodiment of the invention.
Figure 2:
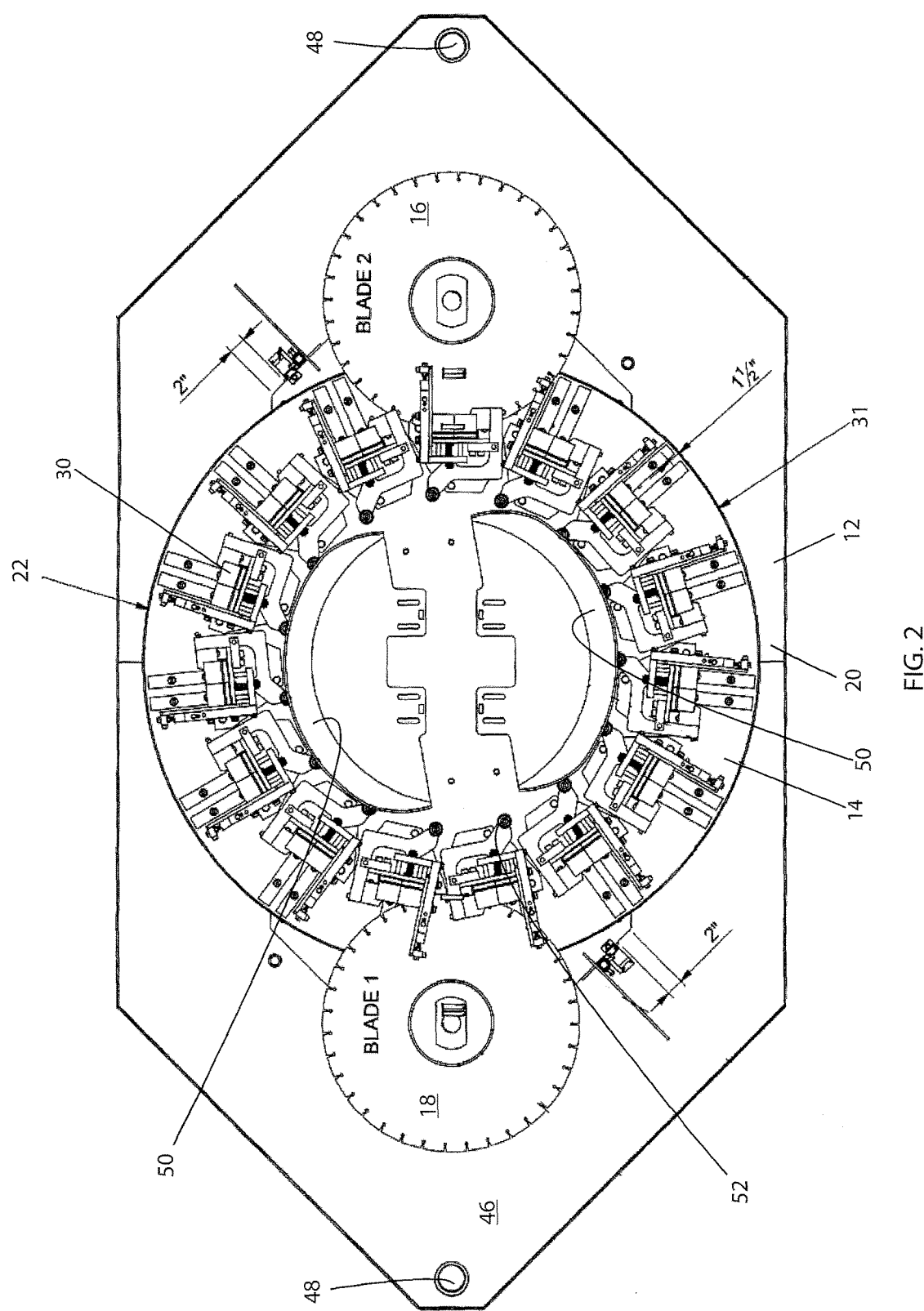
FIG. 2 is a plan view of the embodiment of FIG. 1, with the protective hood and shielding removed to show the cutting saws, cam surface and turntable equipped with jigs.

FIGS. 1 and 2 show features of a brick cutting machine in accordance with an embodiment of the invention. The brick cutting machine 10 includes a frame 12 of a table type form with a super structure made of hollow structural sections (HSS) tube. Other materials such as I-beams or channel members could be used. A turntable 14 and two rotary saws 16 and 18 are mounted onto the table. As can be seen in FIG. 2, the turntable passes under both rotary saw blades, and the saw blades themselves have portions that lie above the turntable 14. Motors 32 and 34 are provided to drive the saw blades and the turntable. In use, bricks will be mounted on jigs 30 on the turntable and rotated past the blades 16 and 18 for cutting.

The apparatus includes hoods 36 that are pivotally mounted to the frame 12 over the saws, and can be raised when the cutting operation is not going on in order to service or to change the blades, etc. Loading and unloading stations 20 and 22 are located on either side of the table are where an operator can stand to load uncut bricks into the jigs and unload already-cut bricks from the jigs 30. The loading and unloading stations can be covered with folding retractable shielding 38 and 40, as seen in FIG. 1. As seen in the figures, two bricks are usually loaded into each jig in order to maximize throughput. While current technology uses humans for loading and unloading at stations 20 and 22, the invention can be implemented by loading and unloading with robots or other mechanical devices.

As seen in FIG. 1, nozzles 42 and 44 are arrayed below and above the blade 16 to spray water on the blade in the direction of the intersection of the blade with the brick. The water has the functions of cooling the blade and preventing dust formation from the material being cut by the brick. This is particularly important in order to prevent particles of silica from becoming airborne, which can pose health hazards for workers. The water and entrained debris collect on the sloped table 46 and flow to drain 48.

As seen in FIG. 2, camming surfaces 50 are provided facing the loading and unloading stations 20 and 22. These camming surfaces act with roller bearings 52 on the jigs 30, in a manner that will be described below with respect to other drawing figures. Suffice it to say that the camming surfaces urge the roller bearings outward at the loading and unloading stations to open the jigs to allow the bricks to be loaded and unloaded. The camming surfaces are not in contact with the bearing rollers 52 adjacent to the blades, so that the jigs fully clamp the bricks to hold the bricks in position while being cut by blade 16 or blade 18, respectively.

As seen in FIG. 2, fifteen jigs 30 are mounted on the turntable. Using an odd number of jigs that are evenly spaced around the turntable causes the jigs to be mounted on the turntable at positions that are not directly opposite one another. As a result the turntable presents bricks to the brick saws alternately, so both saws do not saw bricks simultaneously. This helps prevent resonance (sound and vibration) as the same cross section of the brick is not in a blade on both sides simultaneously. It also helps prevent lurching forward or backward of the turntable because the blades do not both "break through" the last corner of the brick at the same time. The load on the turntable drive relieves somewhat as the blade exits the brick. With an odd number of brick, a more constant load is kept on the gearing and motor that drives the turntable. Avoiding lurching thus helps prevent breakage that may result in flaws.

Figure 3:
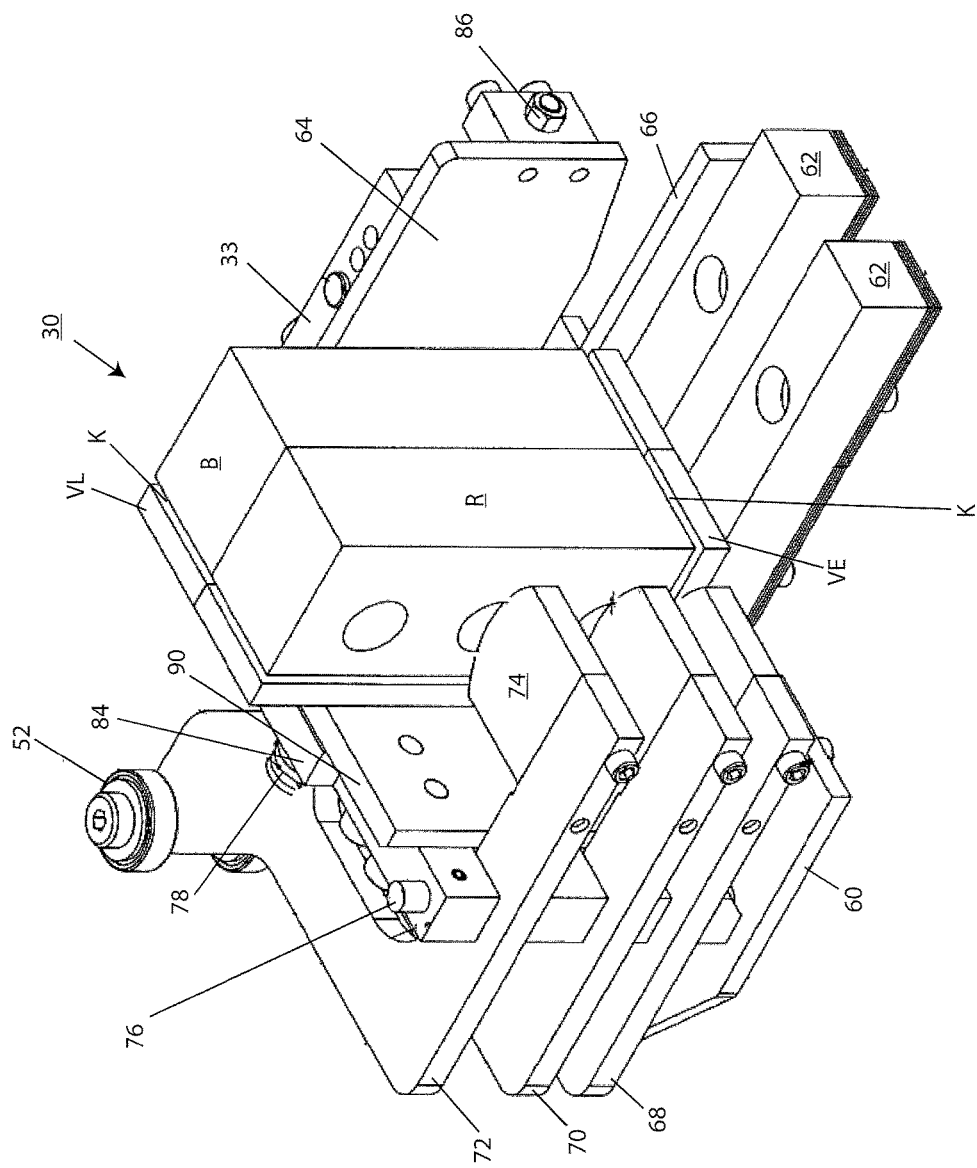
FIG. 3 is a front perspective view of one of the jigs of the embodiment of FIG. 1.
Figure 4:
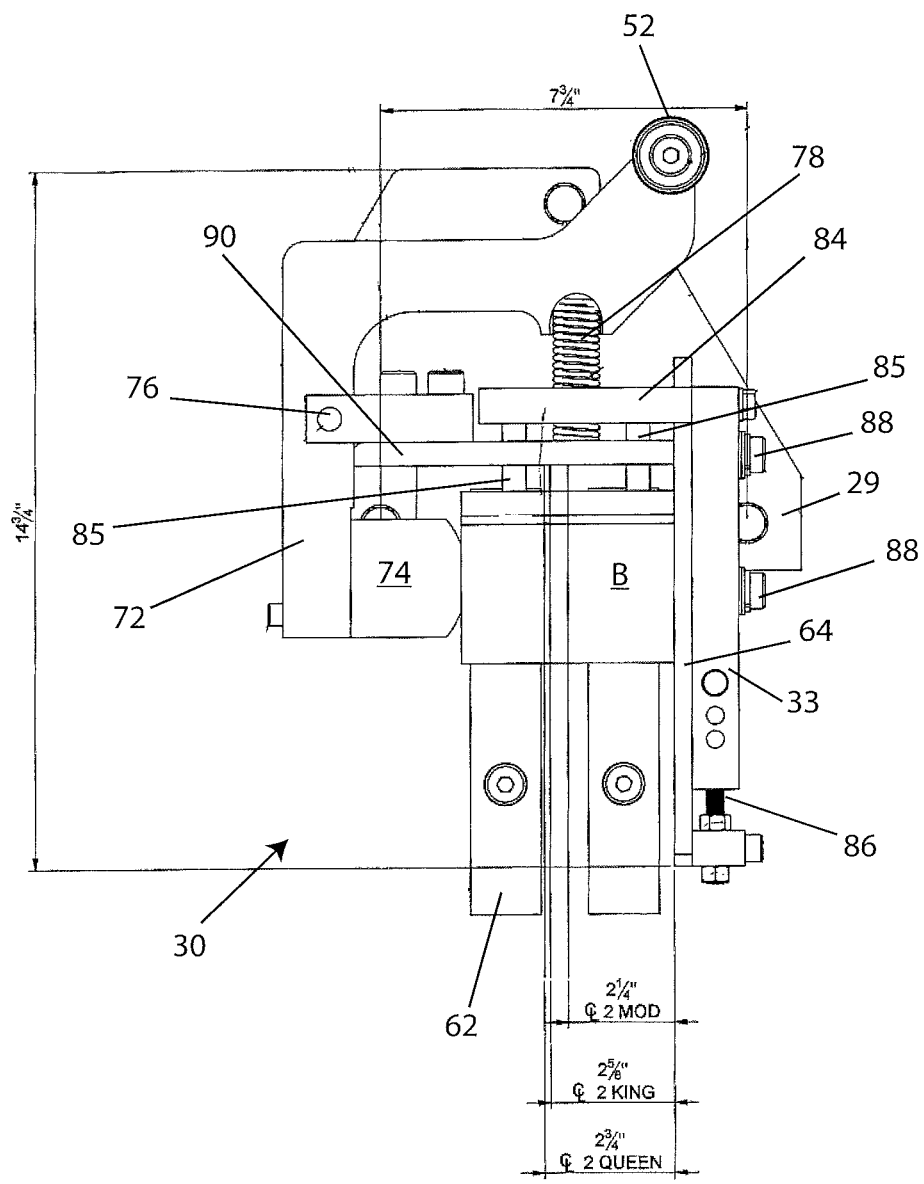
FIG. 4 is a top view of the jig.
Figure 5:
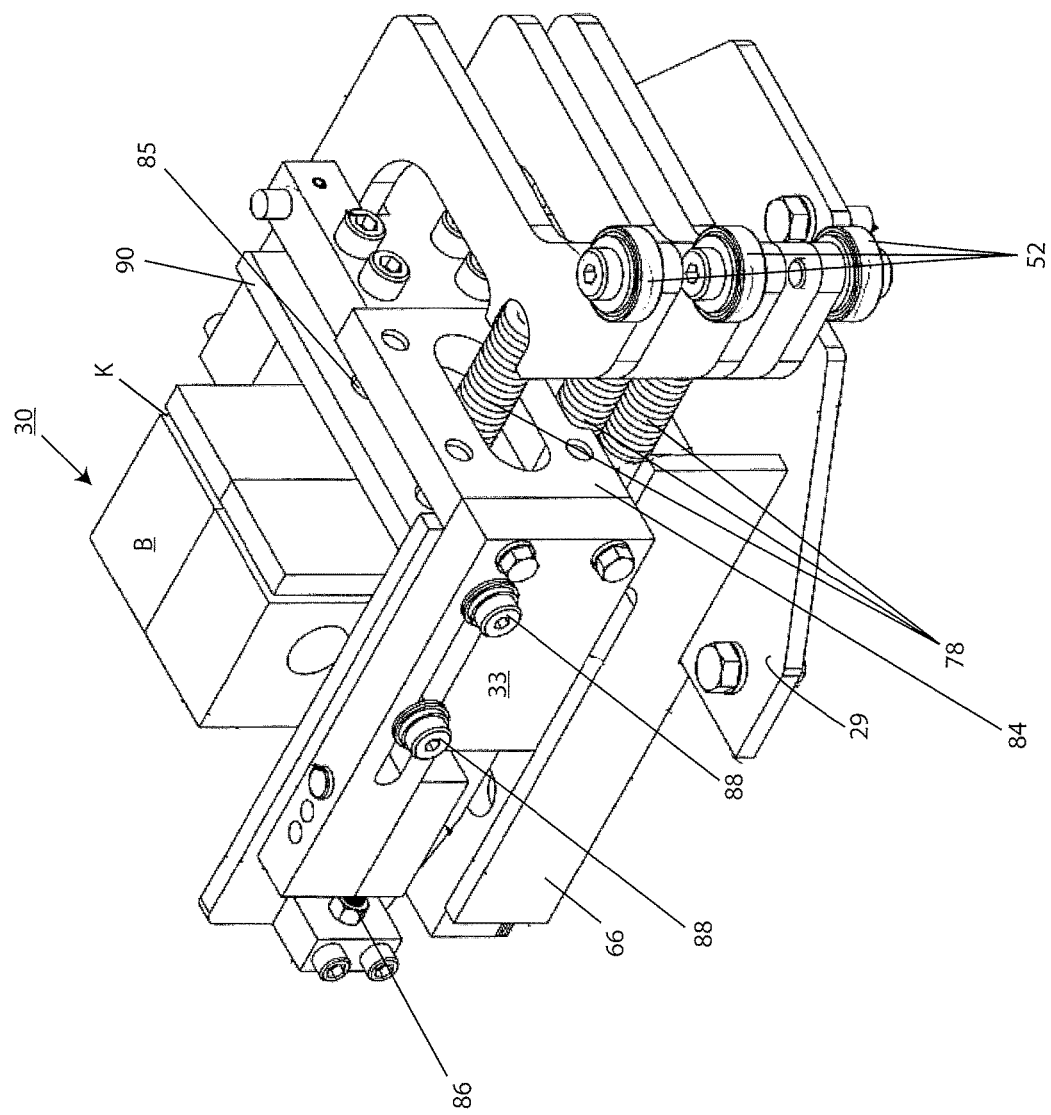
FIG. 5 is a rear perspective view of the jig.

Turning now to FIGS. 3, 4 and 5, one of the jigs 30 is seen in more detail. FIG. 3 shows two bricks B mounted in the jig, having already been cut by blades in two operations, to create a corner veneer having a short side VE and a long side VL with a kerf K where the blade has cut out material from the brick and a residue R.

As seen in the figures, the bricks B are clamped in place between clamp arms 68, 70 and 72, and upper and lower components 64 and 66 of a sideplate. The arms each have a gripper block 74 and the afore-mentioned roller bearing 52. Each of the arms 68, 70 and 72 pivots independently of the other two arms, but they pivot on a common axis 76. The bricks rest on brick supports 62. As can be seen, a gap between the side wall components 66 and 64 aligns with a gap between the gripping arm 68 and 70 and the kerf K between the VE and the residue R of the brick B. This is the location where one of the blades has passed to cause the cutting for the veneer. As seen in FIG. 3, although the brick has already been cut, the kerf above VE does not close, because the bricks are held in place with sufficient compression between the grip arms and the side walls. Preferably, the force on the brick is at least 150 pounds at each of the arms 68, 70, and 72. A jig base 60 provides support for a structure that includes a pivot pin 76 that passes through the arms 68, 70 and 72 between their gripper block 74 and roller bearing 52. Thus, each of the gripper arms 68, 70 and 72 can pivot about the pivot point 76. Each of the three gripper arms is biased toward the brick B by a spring 78 that pushes rearwardly (toward the center of the turntable) on the part of the gripper arm having the roller bearing 52. When the roller bearing 52 encounters the camming surface 50, the springs 78 are compressed, and the gripper arms pivot about pivot point 76 and release the grip of the gripper block 74 on the bricks, enabling an operator to unload the cut bricks (i.e. the veneer and the residue) and reload the jig with fresh bricks to be cut. The springs are selected to exert a considerable force on the arms, preferably causing each of the gripper blocks to exert at least 150 pounds of force on their purchase of the brick.

As seen in FIG. 5, the lower part of the side plate made up of components 64 and 66 is welded to base plate 29. The jig also has a back plate 84 with forward protruding pins 85. The pins 85 pass through holes in vertical plate 90 that is also welded to the base plate 29 and bears against the outer ends of the springs 78. The back plate 84 is bolted to a tee slide 33, which is in turn bolted to the top component 64 of the side plate. The radial position of tee slide inward or outward can be adjusted by loosening the bolts 88 holding the tee slide 33 to the side plate 64 and rotating adjusting screw 86. This causes the tee slide 33, and its associated back plate and protruding pins to move "inward and outward." The brick to be cut is located in the jig in contact with the ends of the pins 85, so adjusting the pin position adjusts the thickness of the cut into the brick.

If flat veneer sides (i.e. not corners) are to be cut, the back plate 84 should be brought forward (radially outward on the turntable) far enough so that the entire brick can be cut. If a corner veneer is intended to be cut, as seen in FIGS. 3 through 5, then the pins 85 need to be more radially inward so the brick can rest far enough back in the jig so that the blade 16 or 18 does not completely cut through the brick, but rather leave a thickness of about ⅝ of an inch (or thicker, such as an inch). A further benefit of the adjustable back plate, particularly when cutting corners, is that the back plate position can be fine-tuned to be sure that the two intersecting kerfs being made in the brick by the two cuts are full, intersecting kerfs. Over time, the saw blade can wear and therefore reduce in diameter, resulting in a kerf that is not a full depth. When this occurs, the machine can be stopped and back plate positions of the jigs can be adjusted to cause the actual position of the brick in the jig to be moved slightly outward radially so that the desired depth of cut can be made.

In operation, the apparatus can be used to cut bricks. The turntable rotates, driven by a motor, causing bearings 52 on arms of the jigs 30 to be urged against a camming surface 50 at the loading and unloading stations to open the clamp arms to permit loading and unloading of unclamped brick. Cut bricks are unloaded and fresh bricks are loaded into the jigs on the turntable at the loading/unloading stations. This takes place while the jigs have opened clamp arms. At least one clamp arm 68 is positioned to clamp the brick against a side plate component 66 below saw blade height and at least one clamp arm 70, 72 positioned to clamp the brick against another side plate component 64 above saw blade height. Throughout loading/unloading the turntable continues to rotate. When the turntable moves past the camming surface 50 the roller bearing 52 moves inwardly to cause clamp arm closure. The two brick saws 16 and 18 adjacent the turntable cut bricks that have been loaded into jigs on the turntable as the jigs with their bricks move past the saws. Preferably, cutting bricks with the two brick saws does not take place simultaneously. As can be appreciated, the device is generally symmetrical about a diagonal, with the two saws being generally equivalent and the two loading/unloading stations being generally equivalent.

Numerous benefits are obtained using the preferred embodiment of the invention. One is that less water is needed than with prior brick cutting machines. The throughput is increased from 400-800 bricks per hour to on the order of 1,600 bricks per hour. The acceptable yield increases from 60% to on the order of 90%, a substantial and dramatic improvement over the prior machines.

The improvement in the quality is believed to be due to the strength of the clamping of the clamping arms on the bricks as they are passing through the cutting operation as well as the clamping of the brick on both sides of the kerf, with each of the clamps being independent of the other. One of the sources of flaws in veneers is believed to be movement of the veneer with respect to the residue near the end of the cutting process, leading to a breakage which can be irregular and therefore a flaw. The more reliable clamping and the smoother operation made possible by the preferred embodiments of the invention minimize such movement.

While the apparatus has been described as having two saws and two loading/unloading positions, it is within the scope of the invention to have more than two of each, likely further increasing throughput. Worker safety would dictate that the turntable be fairly large, to make sure the loading and unloading workers are not dangerously close to the blade and the kerf material it throws. With robotic loading/unloading, that would be less of a concern.

The invention has been shown in detail with the jigs mounted on a rotary turntable, but the jigs can also have utility for brick cutting as mounted on another carriage form, such as a reciprocating table or a chain.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An apparatus for cutting bricks comprising:
   a frame,
   a turntable rotatably mounted to the frame,
   at least two brick saws having blades mounted at spaced positions around the turntable,
   at least two brick loading/unloading stations, the loading/unloading stations spaced from the at least two brick saws, and
   a plurality of brick gripping jigs mounted on the turntable, whereby a brick may be loaded in one of the plurality of brick gripping jigs at one of the at least two loading/unloading stations, rotate on the turntable past one of the at least two brick saws for brick cutting and rotate to another of the at least two brick loading/unloading stations to be unloaded from the one of the plurality of brick gripping jigs.

2. An apparatus as claimed in claim 1 further comprising motors to drive the at least two brick saws and the turntable.

3. An apparatus as claimed in claim 1 further comprising hoods on the frame bounding the at least two brick saws to contain debris generated by sawing.

4. An apparatus as claimed in claim 3 wherein the hoods are pivotally mounted to the frame above the at least two bricks saws.

5. An apparatus as claimed in claim 1 further comprising retractable shielding bounding at least one of the at least two loading/unloading stations.

6. An apparatus as claimed in claim 1 further comprising water nozzles mounted to the frame to send water at the at least two brick saws to entrain debris generated by sawing.

7. An apparatus as claimed in claim 6 further comprising a sloped surface below the at least two brick saws connected to a drain, to allow water and entrained debris to flush to the drain.

8. An apparatus as claimed in claim 1 wherein the plurality of brick gripping jigs each include:
   a jig base having a side plate, and
   a plurality of clamping arms supported above the jig base spaced from the side plate, so that each of the plurality of clamping arms are configured to clamp different parts of the brick against the side plate independently of other of the plurality of clamping arms.

9. An apparatus as claimed in claim 8 wherein at least one of the plurality of clamping arms is positioned so it will pass under the blades of the at least two brick saws, and at least another of the plurality of clamping arms is positioned so it will pass above the blades of the at least two brick saws.

10. An apparatus as claimed in claim 9 wherein each of the plurality of clamping arms has a gripper block and a roller bearing spaced from one another and a pivot mount at a point between the gripper block and the roller bearing.

11. An apparatus as claimed in claim 10 wherein each of the plurality of clamping arms has a spring to urge each of the plurality of clamping arms to pivot toward the side plate.

12. An apparatus as claimed in claim 11 wherein the frame has a camming surface positioned to act on the roller bearing of each of the plurality of clamping arms positioned at the least two loading/unloading stations to act in opposition to the spring and cause each of the plurality of clamping arms to pivot away from the side plate.

13. An apparatus as claimed in claim 8 wherein each of the plurality of clamping arms clamp a brick against the side plate with a force of at least 150 pounds.

14. An apparatus as claimed in claim 8 wherein a back plate is mounted to the jig base perpendicular to the side plate.

15. An apparatus as claimed in claim 14 wherein the position of the back plate can be adjusted on each of the plurality of brick gripping jigs, thereby also adjusting a radial position of the back plate on the turntable.

16. An apparatus as claimed in claim 15 wherein the back plate is mounted to the jig base by bolts that can be turned to adjust the radial position of the back plate on the turntable.

17. An apparatus as claimed in claim 8 wherein the side plate has a lower portion positioned on each of the plurality of brick gripping jigs so it will pass under the blades of the at least two brick saws, and an upper portion positioned on the each of the plurality of brick gripping jigs so it will pass above the blades of the at least two brick saws.

18. An apparatus as claimed in claim 1 whereby a brick may be loaded in each of the plurality of brick gripping jigs, wherein the plurality of brick gripping jigs are mounted on the turntable at positions so that only one of the at least two brick saws is in contact with and cuts only one brick at a time.

19. An apparatus as claimed in claim 1 wherein the brick saws are circular saws.

20. An apparatus for cutting bricks comprising
a frame,
a turntable rotatably mounted to the frame,
at least two brick saws having blades mounted at spaced positions around the turntable,
motors to drive the brick saws and the turntable,
a hood pivotally mounted to the frame above each of the at least two bricks saws and bounding the at least two brick saws to contain debris generated by sawing,
water nozzles mounted to the frame to send water at the at least two brick saws to entrain debris generated by the sawing and a sloped surface below the at least two brick saws connected to a drain, to allow water and entrained debris to flush to the drain,
at least two brick loading/unloading stations, the at least two loading/unloading stations spaced from the at least two brick saws with a retractable shielding bounding at least one of the at least two loading/unloading stations, and
a plurality of brick gripping jigs mounted on the turntable, whereby a brick may be loaded in one of the plurality of brick gripping jigs at one of the at least two loading/unloading stations, rotate on the turntable past one of the at least two brick saws for brick cutting and rotate to another of the at least two brick loading/unloading stations to be unloaded from the one of the plurality of brick gripping jigs,
each of the plurality of brick gripping jigs including a jig base having a side plate, the side plate having a lower portion positioned so it will pass under the blades of the at least two brick saws, and an upper portion positioned so it will pass above the blades of the at least two brick saws, and a plurality of clamping arms supported above the jig base spaced from the side plate, so that each of the plurality of clamping arms are configured to clamp different parts of the brick against the side plate independently of other of the plurality of clamping arms and at least one of the plurality of clamping arms is positioned so it will pass under the blades of the at least two brick saws, and at least another of the plurality of clamping arms is positioned so it will pass above the blades of the at least two brick saws, the each of the plurality of clamping arms having a gripper block, a roller bearing spaced from the gripper block, a pivot mount at a point between the gripper block and the roller bearing, and a spring to urge the each of the plurality of clamping arms to pivot toward the side plate,
the frame having a camming surface positioned to act on the roller bearing of the each of the plurality of clamping arms positioned at the least two loading/unloading stations in opposition to the spring and cause the each of the plurality of clamping arms to pivot away from the side plate to permit the brick loading and unloading, and
each of the plurality of brick gripping jigs also having a back plate adjustably mounted to the jig base perpendicular to the side plate by bolts that can be turned to adjust a radial position of the back plate on the turntable.

21. A gripping jig for holding a brick as the brick is moved relative to a brick saw for brick cutting comprising:
a jig base having a side plate, and
a plurality of clamping arms supported above the jig base spaced from the side plate, so that each of the plurality of clamping arms clamps different parts of the brick against the side plate independently of other of the plurality of clamping arms.

22. A gripping jig as claimed in claim 21 wherein the plurality of clamping arms each grip the brick against the side plate with a force of at least 150 pounds.

23. A gripping jig as claimed in claim 21 wherein at least one of the plurality of clamping arms is positioned on the gripping jig so it will pass under a brick saw blade, and at least another of the plurality of clamping arms is positioned on the gripping jig so it will pass above the brick saw blade and the side plate has a lower portion that passes under the brick saw blade and an upper portion that passes above the brick saw blade.

24. A gripping jig as claimed in claim 23 wherein the plurality of clamping arms each have a gripper block and a roller bearing spaced from one another and a pivot mounted at a point between the gripper block and the roller bearing.

25. A gripping jig as claimed in claim 24 wherein each of the plurality of clamping arms has a spring to urge the each of the plurality of clamping arms to pivot toward the side plate.

26. A gripping jig as claimed in claim 25 wherein the gripping jig can be mounted to a frame that has a camming surface positioned to act on the roller bearing of each of the of the plurality of clamping arms positioned at a loading/unloading station to act in opposition to the spring and cause the each of the plurality of clamping arms to pivot away from the side plate.

27. A gripping jig as claimed in claim 21 wherein a back plate is mounted to the jig base perpendicular to the side plate.

28. A gripping jig as claimed in claim 27 wherein the position of the back plate can be adjusted.

29. A gripping jig as claimed in claim 27 wherein the back plate is mounted to the jig base by bolts that can be turned to adjust a radial position of the back plate.

30. A gripping jig for holding a brick as the brick is moved relative to a brick saw for brick cutting comprising:
a jig base having
a side plate that has a lower portion that passes under a brick saw blade and an upper portion that passes above the brick saw blade,
a back plate that is adjustably mounted to the jig base perpendicular to the side plate by bolts that can be turned to adjust a radial position of the back plate, and
a plurality of clamp arms supported above the jig base spaced from the side plate, so that each of the plurality of clamp arms clamps different parts of the brick against the side plate independently of other of the plurality of clamp arms with at least one of the plurality of clamp arms positioned on the gripping jig so it will pass under the brick saw blade, and at least another of the plurality of clamp arms positioned on the gripping jig so it will pass above the brick saw blade, the plurality of clamp arms each having a gripper block, a roller bearing spaced from the gripper block, a pivot mount at a point between the gripper block and the roller bearing, and a spring to urge the plurality of clamp arms to pivot toward the side plate,
wherein the gripping jig can be mounted to a frame that has a camming surface positioned to act on the roller bearing of each of the plurality of clamp arms positioned at a loading/unloading station to act in opposition to the spring and cause the each of the plurality of clamp arms to pivot away from the side plate.

31. A method of cutting bricks comprising:
loading a first brick into a first jig located on a turntable in a first side station and loading a second brick into a second jig on the turntable in a second side station,
rotating the turntable while operating at least two brick saws positioned adjacent the turntable so that a first of the at least two brick saws can cut the first brick that was loaded into the first jig on the turntable, and a second of the at least two brick saws can cut the second brick that was loaded into the second jig,
wherein the first brick is cut as the turntable rotates the first jig from the first side station to the second side station,
wherein the second brick is cut as the turntable rotates the second jig from the second side station to the first side station,
unloading the first brick that was cut from the first jig in the second side station and unloading the second brick that was cut from the second jig in the first side station.

32. A method as claimed in claim 31 wherein unloading the first brick that was cut from the first jig includes repositioning the first brick that was cut in the first jig to make an additional cut in the first brick, and the unloading the second brick that was cut from the second jig includes repositioning the second brick that was cut in the second jig to make an additional cut in the second brick.

33. A method as claimed in claim 32 wherein the first brick that was cut in the first jig includes cutting most of a long side of the first brick and the additional cut in the first brick includes cutting most of an end of the first brick with each cut intersecting to result in a brick veneer corner.

34. A method as claimed in claim 31 wherein loading the first brick into the first jig includes positioning the first brick in the first jig with at least one opened clamp arm, followed by automatic clamp arm closure.

35. A method as claimed in claim 34 wherein loading the first brick into the first jig includes loading the first brick so that one of at least one clamp arm clamps the first brick against a lower side plate portion below a saw blade height and another of the at least one clamp arm clamps the first brick against an upper side plate portion above saw blade height.

36. A method as claimed in claim 31 wherein rotating the turntable includes causing roller bearings on arms of the first jig to be urged against a cam surface at the first side to open at least one clamp arm to permit loading and unloading of the first brick.

37. A method as claimed in claim 31 further comprising adjusting a radial position of a jig back plate to control a depth of cut into the first brick clamped in the first jig.

38. A method as claimed in claim 31 wherein the first brick and the second brick are not simultaneously cut.

39. A method of cutting bricks comprising:
providing a first loading/unloading side station and a second loading/unloading side station,
rotating a turntable having at least two jigs located thereon, to position a first jig in the first loading/unloading side station and a second jig in the second loading/unloading side station, rotating a turntable causing roller bearings on clamp arms of the first jig to be urged against a first cam surface to open the clamp arms of the first jig to permit loading and unloading of a first brick, rotating a turntable additionally causing roller bearings on clamp arms of the second jig to be urged against a second cam surface, to open the clamp arms of the second jig to permit loading and unloading of a second brick,
loading the first brick into the open clamp arms of the first jig against a first side plate portion of the first jig on the turntable in the first loading/unloading side station and loading the second brick into the open clamp arms of the second jig against a second side plate portion of the second jig on the turntable in the second loading/unloading side station,
continuing to rotate the turntable causing the roller bearings on the clamp arms of the first jig to be released by the first cam surface to secure the first brick against the first side plate of the first jig, the continuing to rotate the turntable additionally causing the roller bearings on the clamp arms of the second jig to be released by the second cam surface to secure the second brick against the second side plate of the second jig,
operating at least two brick saws positioned adjacent the turntable,
cutting the first brick with a first brick saw as the first brick rotates from the first loading/unloading side station to the second loading/unloading side station,
cutting the second brick with a second brick saw as the second brick rotates from the second loading/unloading side station to the first loading/unloading side station, wherein cutting the first brick with a first brick saw and cutting the second brick with a second brick saw are not simultaneously performed, and
unloading the first brick after cutting from the first jig from the second loading/unloading side station, unloading the second brick after cutting from the second jig from the first loading/unloading side station.

* * * * *